Patented Oct. 22, 1929

1,732,737

UNITED STATES PATENT OFFICE

JOHN D. WIGGIN, OF MONTCLAIR, AND MATHIAS M. REMMES, OF BELLEVILLE, NEW JERSEY, ASSIGNORS TO H. B. WIGGIN'S SONS COMPANY, OF BLOOMFIELD, NEW JERSEY, A CORPORATION OF NEW JERSEY

PLASTER AND PROCESS OF CONTROLLING THE SETTING AND EXPANSION OF SETTING, AN ACCELERATOR AND EXPANSION CONTROLLER THEREFOR, AND PROCESS OF MAKING SUCH CONTROLLERS

No Drawing. Application filed July 17, 1924. Serial No. 726,443.

The invention relates to a plaster composition so compounded that both the time within which it sets and its expansion during setting can be controlled by varying the proportions of the elements of the composition.

Another object of the invention is to disclose a process by which such a plaster composition may be made.

A further object of the invention is to disclose a substance which, when mixed with a body of plaster, will influence the rate of setting of the plaster, and will impart antiseptic properties to the plaster.

Another object of this invention is to disclose a substance which, when added to a mixture of water and plaster, increases the fluidity of the mixture prior to setting, and which in addition decreases the expansion of the plaster during setting.

A further and more particular object of the invention is to disclose an accelerator and expansion controller which, when mixed with a body of plaster, will accelerate the setting of the plaster and influence the expansion thereof during setting.

Other objects and features of the invention will more fully appear from the following description and will be particularly pointed out in claims.

The invention herein described is of general application to plasters, but for illustrative purposes it will particularly be described in connection with plaster used for dental work. It is desirable for some purposes that a dental plaster be quick in setting, and that the expansion of the plaster be reduced to a minimum. For obvious reasons it is also desirable that the plaster have antiseptic qualities.

It has been disclosed in the patent to Joseph N. Wiggin, No. 1,460,396, July 3, 1923, that if a plaster of Paris composition is made having a small quantity of water therein, which water is insufficient in amount to cause a setting of the plaster, and this composition allowed to become dry, when the plaster composition is mixed with the additional water necessary to form the mix prior to casting, the plaster composition sets more quickly than it would if the first small quantity of water had not been previously mixed with the plaster.

The plaster composition which we have invented comprises a bulk of plaster containing a fluid of crystallization in amounts insufficient to solidify said mass and also a substance which decreases the expansion of the plaster composition during setting. The preferred substance is boric acid which, in addition to influencing the expansion, increases the fluidity of a mixture of the plaster composition with water, so that in order to obtain the desired consistency of a mixture of the composition with water when the composition is to be poured into the mold, a smaller quantity of water is required than would be required if this substance were not used. The substance also imparts antiseptic qualities to the mix and to the cast which is obtained.

The invention disclosed herein includes in its scope a bulk of plaster containing a sufficient amount of water to accelerate the setting of the plaster when it is mixed with the additional water necessary to form the mix prior to casting and also containing a substance to decrease the expansion of the plaster composition during setting. The expansion controlling substance and the water necessary to accelerate the setting may be added to the bulk of plaster in any suitable manner. By varying the amount of water and expansion controlling substance the time of setting and the expansion during setting may be controlled.

Although various methods may be used to mix the water and expansion controlling substance with the plaster, the method now used to make the plaster composition is to mix with a definite mass of plaster a definite amount of water and a definite amount of the expansion controlling substance, the water being insufficient in amount to solidify said mass. The thus treated mass of plaster containing the expansion controlling substance and a small amount of water of crystallization is, therefore, an accelerator and expansion controller. The treated mass of plaster is mixed with a body of plaster (either pure plaster or plaster containing an additional substance such as cement) to form the plaster composition. The controller may be made with various amounts of fluid of crystallization, and in this way the acceleration resulting from its use may be varied. The amount of the substance which influences the expansion may also be varied, with the result that the expansion may be decreased only slightly or may be reduced to such a point that it is practically nil. It is also obvious that the amount of the controller which is mixed with the main body of plaster may be varied within wide limits, and thus large variations in the time of setting and expansion of the main body of plaster may be had.

In preparing the accelerator and expansion controller it has been found expedient to add the boric acid to the accelerator by dissolving the acid in the water which is used to make the accelerator. In this way a very complete and even distribution of the boric acid throughout the mass of plaster is obtained. In order to add relatively large amounts of boric acid to the accelerator the water to be used in making the accelerator is heated and saturated with boric acid since the acid is quite soluble in hot water. If the water will not dissolve all of the boric acid which it is desired to have in the finished composition, dry boric acid in sufficient amounts to give the desired content is finely pulverized and then thoroughly mixed with the mass of plaster which forms the accelerator and expansion controller.

Boric acid has long been known to be a mild antiseptic, and its use as an expansion controller in connection with the making of dental casts is highly desirable.

It has also been found that in addition to being an antiseptic boric acid has the desirable property of rendering a mixture of plaster and water more fluid than the mixture would be if the boric acid were not present. Thus if boric acid is used as the expansion controller, the mixture of the plaster composition can be made with less water than is usually required, with the result that a harder cast is obtained.

The following is an example of the proportion of the elements and the method at present used in making the plaster composition. The accelerator and expansion controller is made by thoroughly mixing 1,000 lbs. of plaster with 84 lbs. of dry powdered boric acid. While this mass is in agitation a solution of 16 lbs. boric acid in 60½ lbs. of hot water is slowly sprinkled into it. The agitation is continued for approximately an hour. The plaster mass is then slightly damp to the touch and warm due to the chemical reaction which has taken place in the mass. The mixture is allowed to stand for a day or two until the damp feeling has disappeared and the material is thoroughly dry to the touch, the water being all absorbed by the plaster mass as water of crystallization. The dried mass is then pulverized and thoroughly mixed to give a homogeneous mixture. This accelerator and expansion controller is then mixed in any desired proportion with a body of plaster to form the plaster composition.

As an example of the action of the accelerator and expansion controller in influencing the setting and expansion of plaster, it has been found that a composition made of 1,200 lbs. of plaster having mixed therewith 18 to 46 lbs. of the accelerator and expansion controller has a linear expansion during setting of only 8 parts in 50,000, while pure plaster has a corresponding expansion of 120 parts in 50,000. Furthermore, a cast made with the new plaster composition is 25% harder than a cast made from pure plaster and the new plaster composition will set in four minutes instead of the usual time required for the setting of plaster.

The plaster composition herein described may, if desired, include any other substances commonly used to impart desired qualities to the cast. One of the most common of these substances is cement, which is frequently used in connection with plaster for making casts.

Throughout this specification and claims the terms "water", "water of crystallization", "fluid" and "fluid of crystallization", are used to designate the water or fluid which causes the plaster to set, as distinguished from the water or fluid which necessarily enters into the molecule of plaster to constitute the latter when setting. Furthermore, the terms "dry boric acid" and "boric acid without water" are used to denote boric acid in the usual commercial form, containing the water included in molecule, as distinguished from a solution of boric acid in water or other solvent.

We claim:

1. A plaster of Paris composition comprising a mass of powdered plaster of Paris substantially without water, and a second mass of plaster of Paris having mixed therewith water containing boric acid, the water being in less proportion than would be sufficient to solidify said second mass.

2. A plaster of Paris composition comprising a mass of powdered plaster of Paris substantially without water, and a second mass of plaster of Paris having mixed therewith water saturated with boric acid, the water being in less proportion than would be sufficient to solidify said second mass.

3. A plaster of Paris composition comprising a mass of powdered plaster of Paris substantially without water, a second mass of powdered plaster of Paris having mixed therewith water containing boric acid, the water being in less proportion than would be sufficient to solidify said second mass, and additional boric acid without water in quantities to give the boric acid content necessary to reduce to the desired extent the expansion of the composition during setting.

4. A plaster of Paris composition comprising a mass of powdered plaster of Paris substantially without water, a second mass of plaster of Paris having mixed therewith water saturated with boric acid, the water being in less proportion than would be sufficient to solidify said second mass, and additional boric acid without water in quantities to give the boric acid content necessary to reduce to the desired extent the expansion of the composition when setting.

5. A process for controlling the setting and expansion of plaster consisting in mixing therewith a mass of plaster having therein water of less amount than sufficient to solidify said mass, said water containing boric acid to control the expansion of the plaster when setting.

6. A process for controlling the setting and expansion of plaster consisting of mixing therewith a mass of plaster having therein water of less amount than sufficient to solidify said mass, said water being saturated with boric acid to control the expansion of the plaster when setting.

7. A process of making a plaster composition whose setting and expansion can be controlled, consisting in forming an accelerator and expansion controller by saturating hot water with boric acid, and then mixing the water with a mass of plaster in such amounts that the water is insufficient to solidify said mass, and thereafter mixing said accelerator and controller with other plaster.

8. A process of making a plaster composition whose setting and expansion can be controlled, consisting in forming an accelerator and expansion controller by saturating hot water with boric acid, and then mixing the water with a mass of plaster in such amounts that the water is insufficient to solidify said mass, mixing with the plaster thus formed dry boric acid in sufficient amounts to decrease the expansion as desired, and thereafter mixing said accelerator and controller with other plaster.

9. A process of making a plaster composition whose setting and expansion can be controlled, consisting in forming an accelerator and expansion controller by saturating hot water with boric acid, and then mixing the water with a mass of plaster in such amounts that the water is insufficient to solidify said mass, mixing with the accelerator thus formed dry boric acid in sufficient amounts to decrease the expansion as desired, pulverizing the accelerator and controller, and thereafter mixing said accelerator and controller with other plaster.

10. A process of making an accelerator and expansion controller for plaster, consisting in mixing with a mass of plaster water containing boric acid, said water being of an amount less than sufficient to solidify said mass of plaster.

11. A process of making an accelerator and expansion controller for plaster, consisting in mixing with a mass of plaster water saturated with boric acid, said water being of an amount less than sufficient to set said mass of plaster.

12. A process of making an accelerator and expansion controller for plaster, consisting in mixing with a mass of plaster hot water saturated with boric acid, said water being of an amount less than sufficient to set said mass of plaster.

13. A process of making an accelerator and expansion controller for plaster, consisting of mixing with a mass of plaster water saturated with boric acid, said water being of an amount less than sufficient to set said mass of plaster, and dry boric acid in sufficient amounts to decrease the expansion as desired.

In testimony that we claim the foregoing, we have hereunto set our hands this 15th day of July, 1924.

JOHN D. WIGGIN.
MATHIAS M. REMMES.